(12) United States Patent
Nishigaki

(10) Patent No.: US 7,350,952 B2
(45) Date of Patent: Apr. 1, 2008

(54) ILLUMINATION SYSTEM AND DISPLAY DEVICE USING THE SAME

(75) Inventor: Eitaro Nishigaki, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 0 days.

(21) Appl. No.: 11/378,242

(22) Filed: Mar. 20, 2006

(65) Prior Publication Data

US 2006/0221619 A1 Oct. 5, 2006

(30) Foreign Application Priority Data

Apr. 4, 2005 (JP) ............................. 2005-107475

(51) Int. Cl.
*F21V 7/04* (2006.01)
(52) U.S. Cl. ..................... 362/602; 362/341; 362/600; 362/612; 362/613
(58) Field of Classification Search ................ 362/602, 362/341, 600, 601, 612, 613, 623, 84
See application file for complete search history.

(56) References Cited

U.S. PATENT DOCUMENTS

| | | | | |
|---|---|---|---|---|
| 4,991,070 A * | 2/1991 | Stob | ........................... | 362/223 |
| 5,255,171 A * | 10/1993 | Clark | ........................ | 362/231 |
| 5,688,042 A * | 11/1997 | Madadi et al. | ............... | 362/240 |
| 5,921,652 A * | 7/1999 | Parker et al. | ............... | 362/601 |
| 6,186,649 B1 * | 2/2001 | Zou et al. | ................... | 362/347 |
| 6,550,942 B1 * | 4/2003 | Zou et al. | ................... | 362/347 |
| 6,874,924 B1 * | 4/2005 | Hulse et al. | ................ | 362/551 |
| 2002/0080622 A1 * | 6/2002 | Pashley et al. | ............. | 362/555 |
| 2005/0122742 A1 * | 6/2005 | Ho | .............................. | 362/615 |
| 2007/0058357 A1 * | 3/2007 | Yamaguchi et al. | .......... | 362/84 |

FOREIGN PATENT DOCUMENTS

JP  2000-36209  2/2000

* cited by examiner

*Primary Examiner*—Ali Alavi
(74) *Attorney, Agent, or Firm*—McGinn IP Law Group, PLLC

(57) ABSTRACT

An illumination system that makes it possible to generate light with less color irregularity with a simple structure while restraining the increase of size is provided. A tube-shaped reflector having a tube-shaped wall whose inner surface is reflective is provided. The wall includes an aperture extending along a longitudinal axis of the reflector. In the reflector, plural sets of LEDs are arranged, where colors of light to be emitted from the LEDs in each set are different (for example, red, green, or blue LEDs are used for each set). The LEDs in each set are arranged along the longitudinal axis of the reflector to form a linear light source. A collecting lens is fixed to the reflector in such a way as to fill the aperture of the reflector.

18 Claims, 9 Drawing Sheets

ILLUMINATION SYSTEM AND DISPLAY DEVICE USING THE SAME

BACKGROUND OF THE INVENTION

1. Field of the Invention

The present invention relates to an illumination system and a display device using the same and more particularly, to an illumination system comprising Light-Emitting Diodes (LEDs) as point light sources, and a display device such as a Liquid-Crystal Display (LCD) device using the illumination system. The invention is preferably applied to a backlight unit of a LCD device; however, it is applicable to any other display device than the LCD device if it comprises plural sets of LEDs whose colors of emitted light are different.

2. Description of the Related Art

The LCD device has been extensively used for various devices and systems, such as Office Automation (OA) apparatuses, Audio-Visual (AV) apparatuses, portable information or communication terminals and so on, because of its characters such as compactness, thinness, and low power-consumption. The LCD device comprises as its main components a LCD panel having a pair of opposing transparent substrates and a liquid crystal layer interposed between the substrates, and a backlight unit for generating backlight illuminating the panel. The liquid crystal layer is controlled in such a way as to adjust the transmittance or transmitting quantity of light emitted from the backlight unit, thereby displaying images on the screen.

Conventionally, the backlight unit comprises a fluorescent lamp or lamps as its light source. However, to drive or turn on the lamp or lamps, peripheral circuits such as an inverter circuit are required. Moreover, the inverter circuit makes noises. Therefore, recently, it is popular to use LEDs instead of the fluorescent lamp or lamps.

Typically, the backlight unit comprises plural sets of LEDs arranged in a predetermined manner, where each set of LEDs emit red (R), green (G) or blue (B) light. The red, green and blue light emitted from the respective LEDs are then mixed together to generate white light. Thus, there is a problem that color irregularity is likely to occur on the display screen due to the arrangement or layout of the LEDs occurs.

To cope with this problem, an improvement was developed and disclosed in the Japanese Non-Examined Patent Publication No. 2000-36209. This improvement relates to a linear light source as shown in FIG. 1. As seen from FIG. 1, this prior-art linear light source comprises a set of LEDs 110a serving as point light sources 110, a diffusing plate 111, and a light guide plate 112. The diffusing plate 111 receives the light emitted from the LEDs 110a. The light guide plate 112 receives the light from the diffusing plate 111 and emits light from a flat surface of the plate 112. The LEDs 110a are arranged along a straight line at equal intervals P in parallel to a diffusing plate 111, as shown in FIG. 1A. The LEDs 110a are apart from the diffusing plate 111 at a distance L, as shown in FIG. 1B. The interval P and the distance L have a predetermined relationship, thereby generating approximately uniform luminance distribution.

In the case where a light source is formed by plural sets of LEDs whose light colors are different from each other, it is important to uniformly mix the light of the respective colors. With the improvement shown in FIGS. 1A and 1B where the distance L between the LEDs 10a and the diffusing plate 111 is increased, there is a disadvantage that the illumination system will be large. This enlarged size of the system will be a serious drawback if this improvement is applied to an illumination system of portable information or communication terminals. Moreover, there is another disadvantage that obtainable luminance is lowered due to the large distance L.

To reduce the color irregularity due to the arrangement or layout of the LEDs, there is a way of separately controlling the respective LEDs. In this case, however, many power supplies and many control circuits are required for lighting the LEDs. In particular, with an illumination system for illuminating a large-sized screen, the count of LEDs is large and thus, there arises a problem that the structure is complicated and the price is raised.

SUMMARY OF THE INVENTION

The present invention was created in consideration of the above-described problems.

Accordingly, a main object of the present invention is to provide an illumination system that makes it possible to generate light with less color irregularity with a simple structure while restraining the increase of size, and a display device equipped with the illumination system.

The above object together with others not specifically mentioned will become clear to those skilled in the art from the following description.

According to a first aspect of the present invention, an illumination system is provided, which comprises a tube-shaped reflector having a tube-shaped wall whose inner surface is reflective, the wall including an aperture extending along a longitudinal axis of the reflector;

plural sets of LEDs arranged in the reflector, colors of light to be emitted from the LEDs in each of the sets being different, the LEDs in each of the sets being arranged along the longitudinal axis of the reflector to form a linear light source; and a collecting lens fixed to the reflector in such a way as to fill the aperture of the reflector.

With the illumination system according to the first aspect of the present invention, a tube-shaped reflector having a tube-shaped wall whose inner surface is reflective is provided. The wall includes an aperture extending along a longitudinal axis of the reflector. Plural sets of LEDs are arranged in the reflector, colors of light to be emitted from the LEDs in each of the sets being different. The LEDs in each of the sets are arranged along the longitudinal axis of the reflector to form a linear light source. A collecting lens is fixed to the reflector in such a way as to fill the aperture of the reflector. Therefore, the light emitted from the respective LEDs can be repeatedly reflected by the inner surface of the reflector and as a result, the light can be sufficiently mixed together to thereby generate white light. This means that white light with less color irregularity is realizable with a simple structure while restraining the increase of size of the illumination apparatus.

Preferably, a cross section of the reflector along a plane perpendicular to the longitudinal axis is approximately circular, elliptical, or polygonal.

It is preferred that the inner surface of the reflector has surface irregularities. This is because diffused reflection of the light from the LEDs is enhanced.

The LEDs in the respective sets may be arranged along the longitudinal axis at approximately equal or unequal intervals. Moreover, the LEDs in the respective sets may be arranged along a circumferential direction of the reflector at approximately equal or unequal distances.

The LEDs in the respective sets may be simply located directly on the inner surface of the reflector. However, it is preferred that the LEDs in each of the sets are located on a base, where the bases are fixed onto the inner surface of the reflector at intervals along a circumferential direction of the reflector.

In a preferred embodiment of the illumination system according to the first aspect of the present invention, a sub-reflector is additionally provided. The sub-reflector is fixed to the reflector and extended along the longitudinal axis of the reflector. The sub-reflector is located in such a way as to shield or block the light emitted from the LEDs toward the collecting lens. In this embodiment, because of the sub-reflector additionally provided in the reflector, the reflection frequency of the light can be increased furthermore and the light from the LEDs toward the collecting lens can be shielded or blocked. Thus, the effect of reducing the color irregularity is enhanced, which means that the color irregularity is further improved.

Preferably, sub-reflector has an approximately flat, V-shaped, or arc-shaped cross section along a plane perpendicular to the longitudinal axis.

Similar to the reflector, it is preferred that the sub-reflector has surface irregularities. This is because diffused reflection of the light from the LEDs is enhanced.

It is preferred that the sub-reflector is apart from the inner surface of the reflector. This is because the light from the LEDs toward the collecting lens is efficiently blocked.

In another preferred embodiment of the illumination system according to the first aspect of the present invention, sub-reflectors are additionally provided for the respective sets of LEDs. The sub-reflectors are fixed to the reflector and extended along the longitudinal axis of the reflector. Each of the sub-reflectors is located in such a way as to shield or block the light emitted from the LEDs in the corresponding one of the sets toward the collecting lens. In this embodiment, because of the sub-reflectors additionally provided for the respective sets of LEDs, the effect of reducing the color irregularity is further enhanced with respect to the above-described embodiment.

Preferably, at least one of the sub-reflectors has an approximately flat, V-shaped, or arc-shaped cross section along a plane perpendicular to the longitudinal axis.

Similar to the reflector, it is preferred that at lease one of the sub-reflectors has surface irregularities. This is because diffused reflection of the light from the LEDs is enhanced.

It is preferred that the sub-reflectors are apart from the inner surface of the reflector. This is because the light from the LEDs toward the collecting lens is efficiently blocked.

In still another preferred embodiment of the illumination system according to the first aspect of the present invention, the LEDs in a first one of the sets emit red light, the LEDs in a second one of the sets emit green light, and the LEDs in a third one of the sets emit blue light.

According to a second aspect of the present invention, a display device is provided, which comprises one of the illumination systems as described above; a light guide plate having an input end located to confront with the collecting lens of the illumination system; and a display panel located to confront with an output end of the light guide plate.

With the display device according to the second aspect of the present invention, the illumination system according to the first aspect of the invention is included. Therefore, display quality of the display device can be enhanced or improved.

In a preferred embodiment of the display device according to the second aspect of the present invention, an LCD panel is included as the display panel, and the illumination system is included as a backlight unit for the LCD panel.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1A:
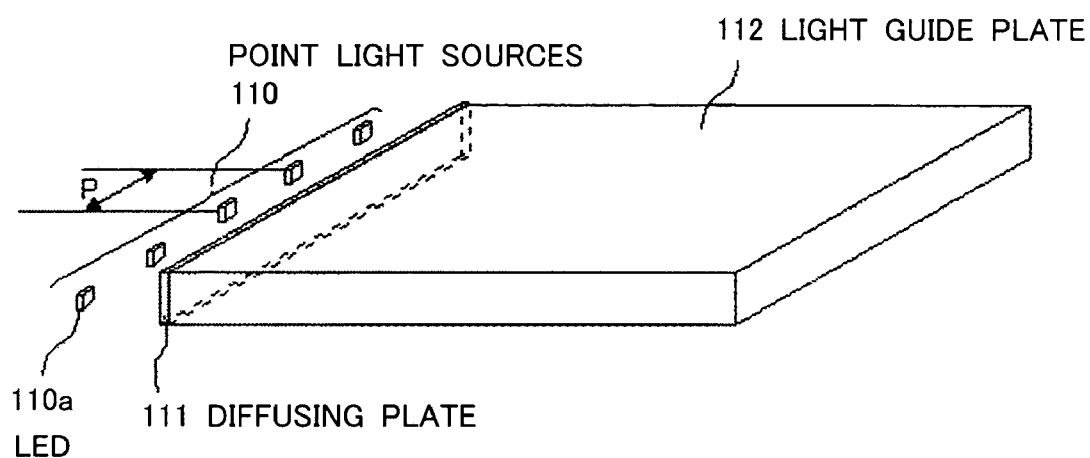
FIG. 1A is a schematic perspective view showing the structure of a prior-art linear light source.

Preferred embodiments of the present invention will be described in detail below while referring to the drawings attached.

Figure 1B:
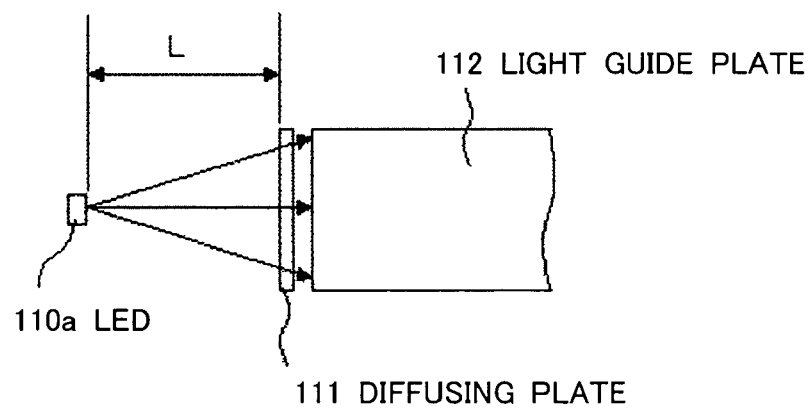
FIG. 1B is a schematic plan view showing the arrangement of the LEDs, the diffusing plate, and the light guide plate of the prior-art linear light source of FIG. 1A.

As explained in the BACKGROUND OF THE INVENTION, with an illumination system comprising red-, green-, and blue-light emitting LEDs as point light sources, it is important to sufficiently mix the red, green, and blue light together to generate white light. In this case, there is a problem that color irregularity is likely to occur in the light guide plate due to the arrangement or layout of the LEDs. To solve this problem, the distance between the point light sources (i.e., LEDs) and the diffusing plate may be increased, as previously explained with reference to FIGS. 1A and 1B. However, this measure arises another problem that the size of the illumination system is increased and the luminance is lowered.

Moreover, as another measure for reducing the color irregularity, respective LEDs may be controlled separately. In this case, however, many power supplies and many control circuits are required for lighting the LEDs, which arises another problem that the structure is complicated and the price is raised.

Accordingly, in the present invention, to make it possible to generate white light with less color irregularity while restraining the increase of the size of an illumination system without complicating the structure, a tube-shaped reflector having a tube-shaped wall whose inner surface is reflective is provided. The wall includes an aperture extending along a longitudinal axis of the reflector. In the reflector, plural sets of LEDs are arranged, where colors of light to be emitted from the LEDs in each of the sets are different. For example, red, green, or blue LEDs are used for each set. The LEDs in each of the sets are arranged along the longitudinal axis of the reflector to form a linear light source. A collecting lens (e.g., a bar-shaped lens) is fixed to the reflector in such a way as to fill the aperture of the reflector.

Because of such simple structure as above, the light from the respective LEDs, which include different colors, will be repeatedly reflected by the inner surface of the reflector and mixed, and finally collected by the collecting lens. Thereafter, the light from the collecting lens is traveled or irradiated to the input end of the light guide plate. As a result, white light with less color irregularity is obtainable.

Next, concrete configurations of the invention will be explained below.

First Embodiment

An illumination system and a LCD device according to a first embodiment of the invention will be explained with reference to FIGS. 2A, 2B and 3.

Figure 2A:
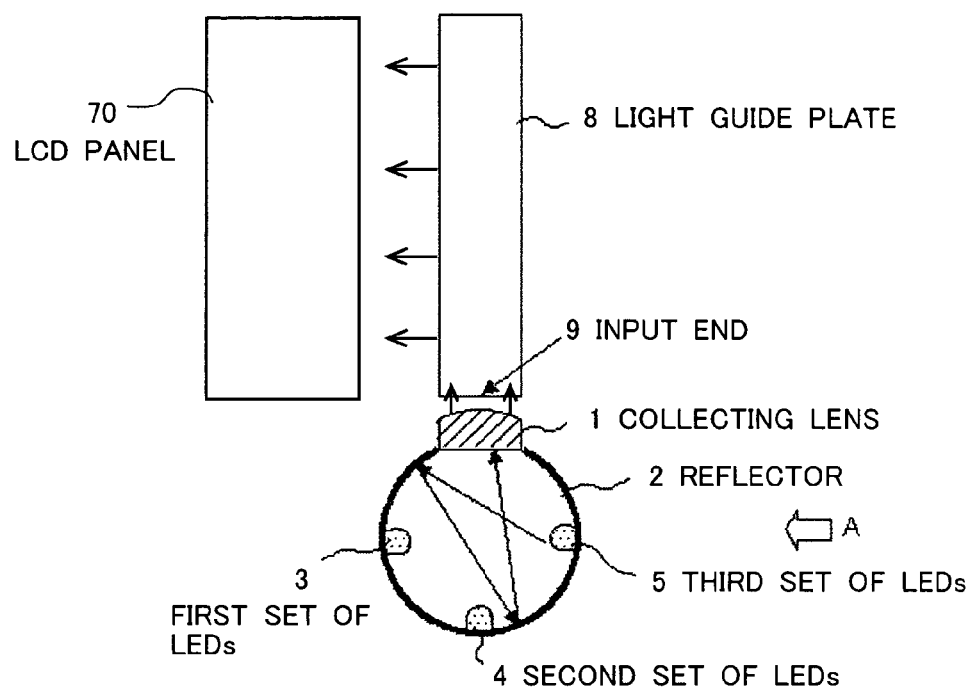
FIG. 2A is a schematic cross-sectional view of an illumination system according to a first embodiment of the invention, in which a light guide plate and a LCD panel are additionally shown.
Figure 2B:
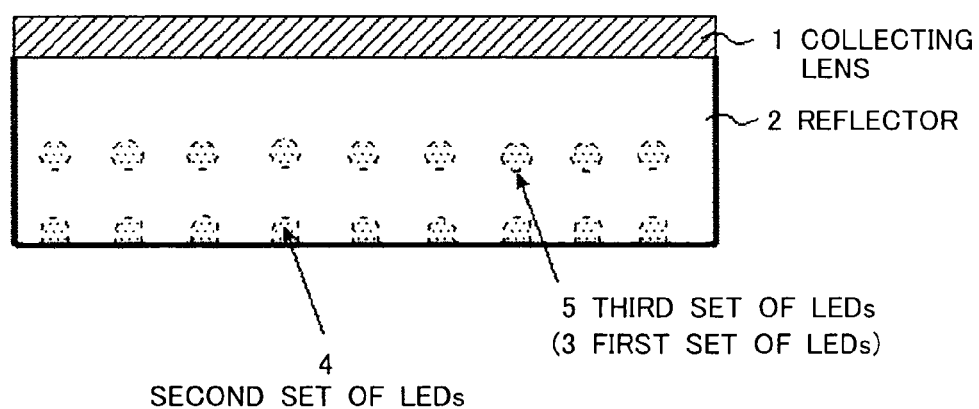
FIG. 2B is a schematic rear view of the illumination system according to the first embodiment of the invention, which is seen in the direction A in FIG. 2A.
Figure 3:
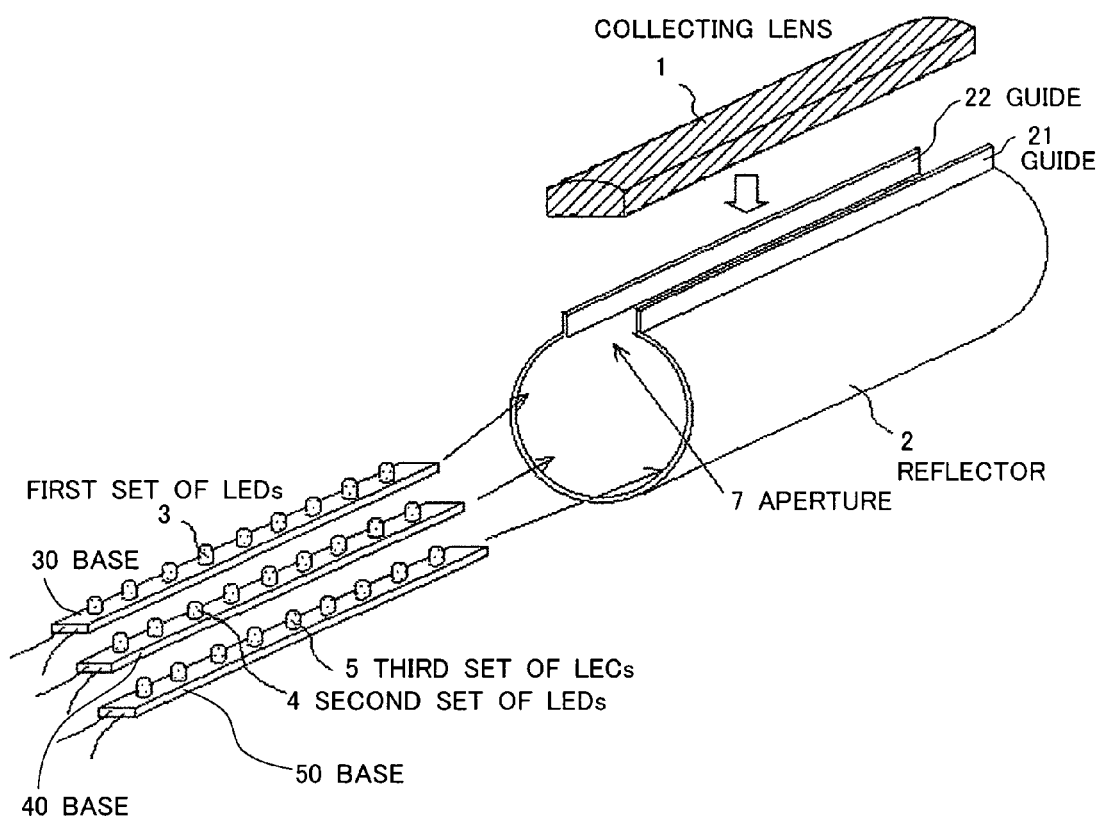
FIG. 3 is a schematic exploded perspective view showing an assembling manner of the illumination system according to the first embodiment of the invention, where the first LEDs, second LEDs, and third LEDs are respectively fixed on their bases.

As shown in FIG. 2A, 2B and 3, the illumination system according to the first embodiment comprises a cylindrical reflector or reflection member 2 having an aperture or slit 7, a first set of LEDs 3, a second set of LEDs 4, a third set of LEDs 5, and a bar-shaped collecting lens 1. The aperture or slit 7 extends along the longitudinal axis of the reflector 2. The collecting lens 1 is fixed to the reflector 2 to close the aperture 7. The lens 1 is parallel to the longitudinal axis of the reflector 2.

Although not shown, it is needless to say that two end plates are fixed to the approximately circular openings of the reflector 2 at its right and left ends. Preferably, the inner surfaces of the end plates are formed reflective.

The first, second and third sets of LEDs 3, 4, and 5 emit light of different colors, e.g., red, green, and blue. These LEDs 3, 4, and 5 are arranged on the curved inner surface of the reflector 2 in such a way as to be oriented toward the central, longitudinal axis of the reflector 2. The LEDs 3 in the first set are arranged linearly along the longitudinal axis of the reflector 2. Similarly, the LEDs 4 in the second set and the LEDs 5 in the third set are arranged linearly along the longitudinal axis of the reflector 2, respectively. Therefore, the LEDs 3, 4, and 5 are parallel to the collecting lens 1.

A light guide plate 8 is located in parallel to the collecting lens 1 of the illumination system. Thus, the LEDs 3, 4, and 5 are also in parallel to the light guide plate 8. The light guide plate 8 serves as a planar light source. The plate 8 receives the incident light entering by way of the input end 9 and emits illumination light by way of its output surface, thereby illuminating an LCD panel 70 confronted with the output surface of the plate 8.

It is sufficient that the inner surface or surfaces of the reflector 2 has/have an optical reflection function. Thus, the reflector 2 may be formed by processing a metal plate or plates (e.g., an aluminum plate) or by forming a metal film on the inner surface of a molded cylindrical plastic. The aperture or slit 7 may be formed by splitting the cylindrical wall of the reflector 2 or by cutting an elongated part of the cylindrical wall of the reflector 2 away.

Figure 5A:
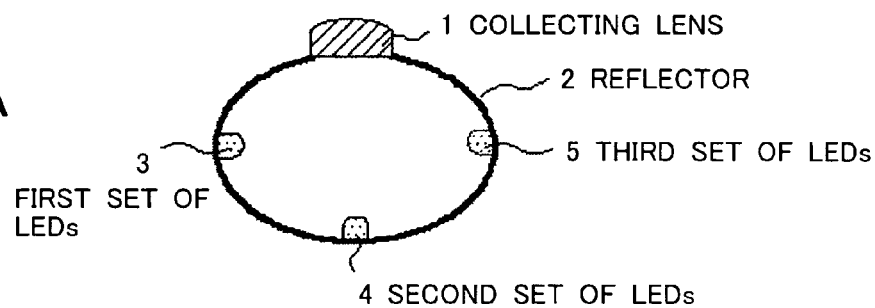
FIG. 5A is a schematic cross-sectional view of an illumination system according to another variation example of the first embodiment of the invention, where the cross-sectional shape of the reflector is elliptical.
Figure 5B:
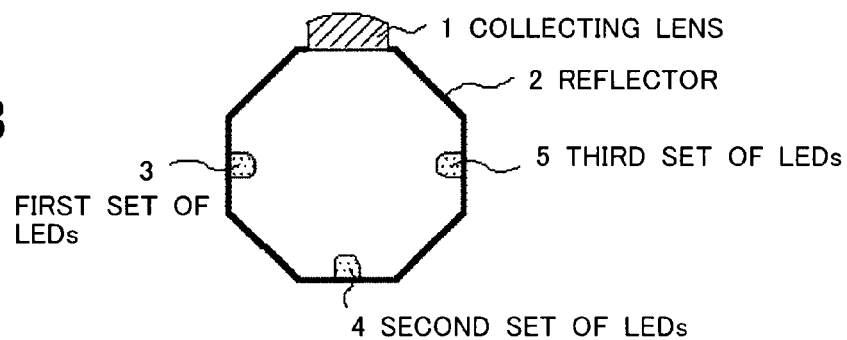
FIG. 5B is a schematic cross-sectional views of an illumination system according to still another variation example of the first embodiment of the invention, where the cross-sectional shape of the reflector is polygonal.
Figure 5C:
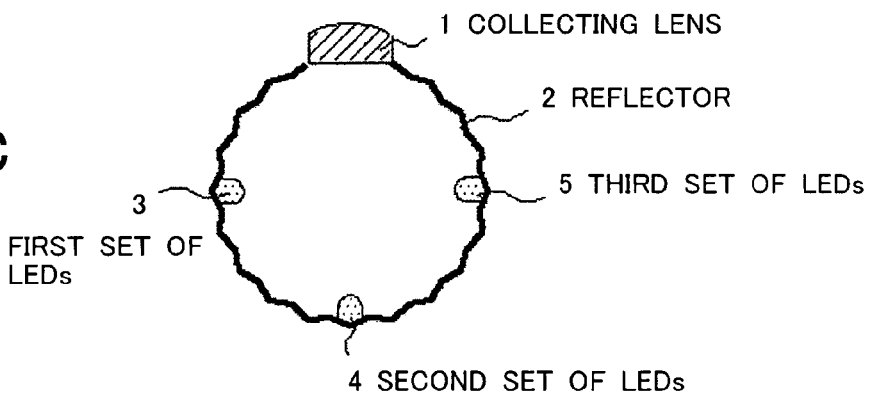
FIG. 5C is a schematic cross-sectional view of an illumination system according to a further variation example of the first embodiment of the invention, where the cross-sectional shape of the reflector is approximately circular and the wall of the reflector is waved to form surface irregularities on its inner and outer surfaces.

In the first embodiment of FIGS. 2A and 2B, the cross-sectional shape of the reflector 2 in the plane perpendicular to the longitudinal axis of the reflector 2 is approximately circular. However, the cross-sectional shape of the reflector 2 is not limited to this. For example, the cross-sectional shape of the reflector 2 may be elliptical, as shown in FIG. 5A, or polygonal, as shown in FIG. 5B. Moreover, the inner surface of the reflector 2 may be formed like a mirror surface. However, to cause diffused reflection of the light from the LEDs 3, 4, and 5, the cylindrical wall itself of the reflector 2 or its inner surface may be waved or roughened to form minute surface irregularities or bumpiness, as shown in FIG. 5C. The surface irregularities or bumpiness may be formed on only the inner surface of the reflector 2.

Figure 4A:
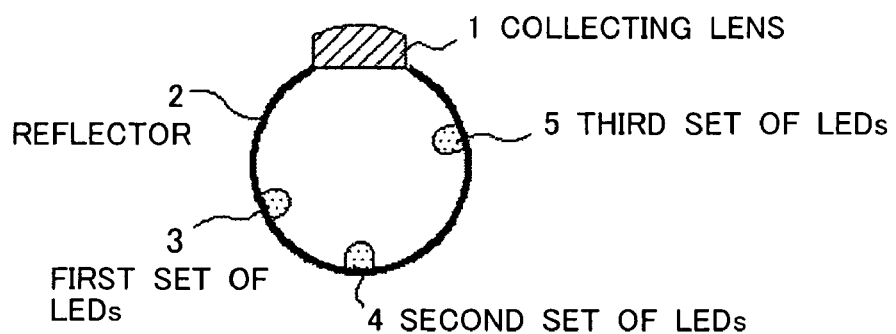
FIG. 4A is a schematic cross-sectional view of an illumination system according to a variation example of the first embodiment of the invention, where the arrangement of the LEDs are different from that of FIGS. 1A and 1B.

The arrangement of the sets of LEDs 3, 4, and 5 is not limited to that shown in FIGS. 2A and 2B. The LED arrangement may be changed according to the luminance and/or emission spectrum of the respective LEDs 3, 4, or 5. For example, the first, second, and third sets of LEDs 3, 4, or 5 may be arranged on the inner surface of the reflector 2 in such a way as to equally divide the arc-shaped circumference of the reflector 2, as shown in FIG. 2A. In other words, the distance between the first and second sets of LEDs 3 and 4 may be equal to the distance between the second and third sets of LEDs 4 and 5, as shown in FIG. 2A. This means that the first and third sets of LEDs 3 and 5 are arranged symmetrically with respect to the second set of LEDs 4. However, these LEDs 3, 4 and 5 may be arranged asymmetrically, for example, by shifting the first set of LEDs 3 toward the second set of LEDs 4 along the inner surface of the reflector 2, as shown in FIG. 4A. In the LED arrangement of FIG. 4A, the distance between the first and second sets of LEDs 3 and 4 is smaller than the distance between the second and third sets of LEDs 4 and 5.

Figure 4B:
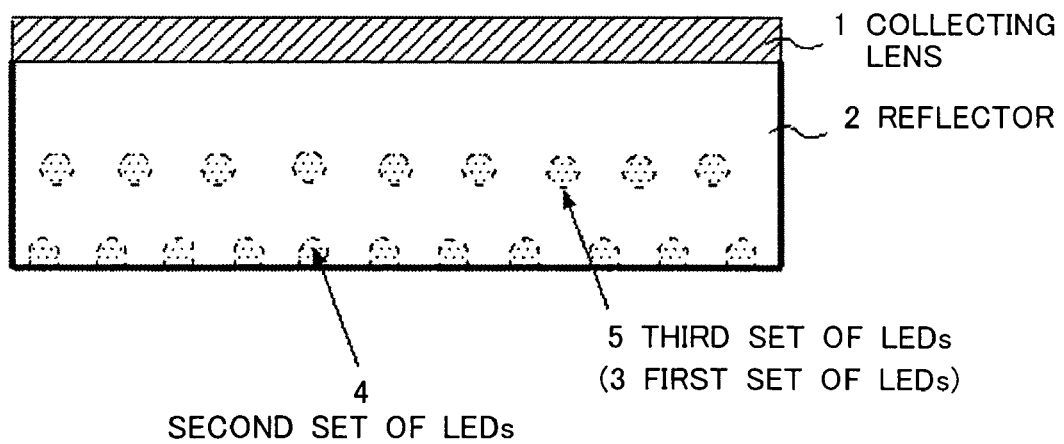
FIG. 4B is a schematic rear view of the illumination system according to the variation example of the first embodiment of the invention, which is seen in the direction A in FIG. 2A.

Although the intervals of the LEDs 3, 4, or 5 along the longitudinal axis of the reflector 2 are equal in the structure of FIG. 2B according to the first embodiment, they may be changed. For example, the intervals of the LEDs 4 may be different from those of the LEDs 3 and 5, as shown in FIG. 4B. In the structure of FIG. 4B, the intervals of the LEDs 4 are smaller than the intervals of the LEDs 3 and 5, where the intervals of the LEDs 3 and 5 are equal.

The fixing structure of the LEDs 3, 4, and 5 onto the inner surface of the reflector 2 is not limited to those shown here. For example, holes may be formed through the wall of the reflector 2 and the LEDs 3, 4, and 5 may be respectively inserted into the holes and fixed in these positions. Alternately, the LEDs 3, 4, and 5 may be respectively fixed on their bases 30, 40 and 50, as shown in FIG. 3 and thereafter, the bases 30, 40 and 50 may be secured to the inner surface of the reflector 2 in its inside. In this case, if the LEDs 3, 4, and 5 have directivity, it is preferred that the optical axis of each of the LEDs 3, 4, and 5 is oriented toward the central axis of the reflector 2. However, the optical axis may be somewhat deviated from the central axis, which results in no problem.

Regarding the collecting lens 1, it is sufficient that the lens 1 has a function of collecting the light emitted from the LEDs 3, 4, and 5 and reflected by the inner surface of the reflector 2 and of emitting the light thus collected toward the light guide plate 8. Thus, the shape of the lens 1 is optionally changeable if the lens 1 is fixed to the reflector 2 to block the whole aperture 7. The lens 1 may be formed by a single lens or a set of assembled lenses.

The fixing structure of the collecting lens 1 to the reflector 2 is not limited. For example, as shown in FIG. 3, a pair of guides 21 and 22 may be respectively formed on the opposing edges of the reflector 2 near the aperture 7 and then, the lens 1 may be sandwiched and fixed by the guides 21 and 22, as shown in FIGS. 2A and 2B.

Next, the operation of the illumination system according to the first embodiment will be explained below.

For example, as shown in FIG. 2A, the light emitted from the third set of LEDs 5 is reflected by the inner surface of the reflector 2 plural times (twice in FIG. 2A) to enter the collecting lens 1. Thereafter, the light penetrates through the lens 1 to enter the light guide plate 8 by way of its input end 9. Similarly, the light emitted from the first set of LEDs 3 and the second set of LEDs 4 is reflected by the inner surface of the reflector 2 plural times to enter the collecting lens 1. Thereafter, the light penetrates through the lens 1 to enter the light guide plate 8 by way of its input end 9. Here, it is supposed that the light color of the first set of LEDs 3 is red, the light color of the second set of LEDs 4 is green, and the light color of the third set of LEDs 5 is blue. Then, the red, green, and blue light from these LEDs 3, 4, and 5 are sufficiently mixed together in the cylindrical reflector 2, thereby generating white light with less color irregularity.

Moreover, when a function of adjusting the luminance of the respective LEDs 3, 4, and 5 is provided, the white balance can be varied and therefore, desired white balance can be obtained.

As explained above, with the illumination system according to the first embodiment of the invention, the tube-shaped reflector 2 having the tube-shaped wall whose inner surface is reflective is provided. The wall includes the elongated aperture 7 extending along the longitudinal axis of the reflector 2. In the reflector 2, the first, second, and third sets of LEDs 3, 4, and 5 that emit different color of light are arranged at the predetermined distances along the circumferential direction of the reflector 2. The LEDs 3, 4, and 5 are arranged along the longitudinal axis of the reflector 2 to form linear light sources. The bar-shaped collecting lens 1 is fixed to the reflector 2 in such a way as to fill or block the aperture 7. Therefore, the light emitted from the respective LEDs 3, 4, and 5 can be repeatedly reflected on the inner surface of the reflector 2 and as a result, the light can be sufficiently mixed together in the reflector 2 and collected by the collecting lens 1, thereby generating white light. This means that white light with less color irregularity is realizable with a simple structure while restraining the increase of size of the illumination system.

The illumination system according to the first embodiment may be used as the backlight unit of a LCD device. In this case, as shown in FIG. 2A, the LCD device comprises the said illumination system as the backlight unit, the light guide plate 8, and the LCD panel 70. Since the illumination system according to the first embodiment is used as the backlight unit, the display quality of the LCD device is improved.

Second Embodiment

Next, an illumination system and a LCD device according to a second embodiment of the invention will be explained with reference to FIGS. 6A, 6B and 7.

With the above-described illumination system according to the first embodiment, the light emitted from the respective LEDs 3, 4, and 5 is repeatedly reflected on the inner surface of the reflector 2 prior to entering the collecting lens 1. This means that the light is reflected by the reflector 2 only. Unlike this, with the illumination system according to the second embodiment, a tape-shaped sub-reflector or a sub-reflection member 6 is additionally provided. This is based on the consideration about the fact that the more the reflection frequency of the light, the higher the mixing uniformity of colors.

Figure 6A:
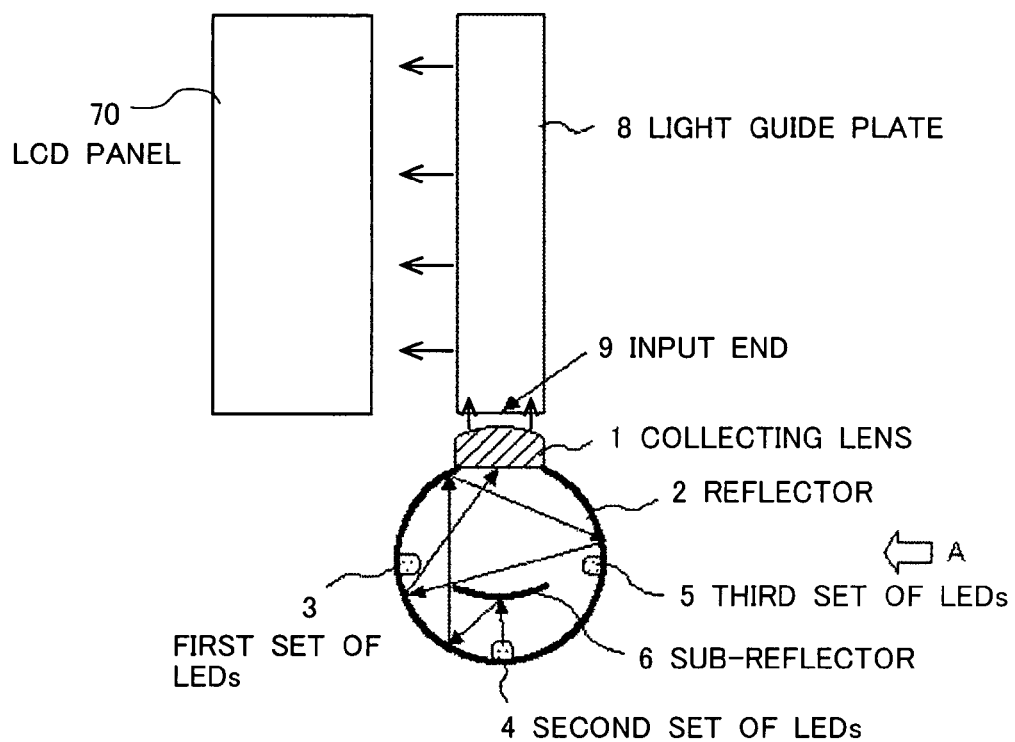
FIG. 6A is a schematic cross-sectional view of an illumination system according to a second embodiment of the invention, in which a light guide plate and a LCD panel are additionally shown.
Figure 6B:
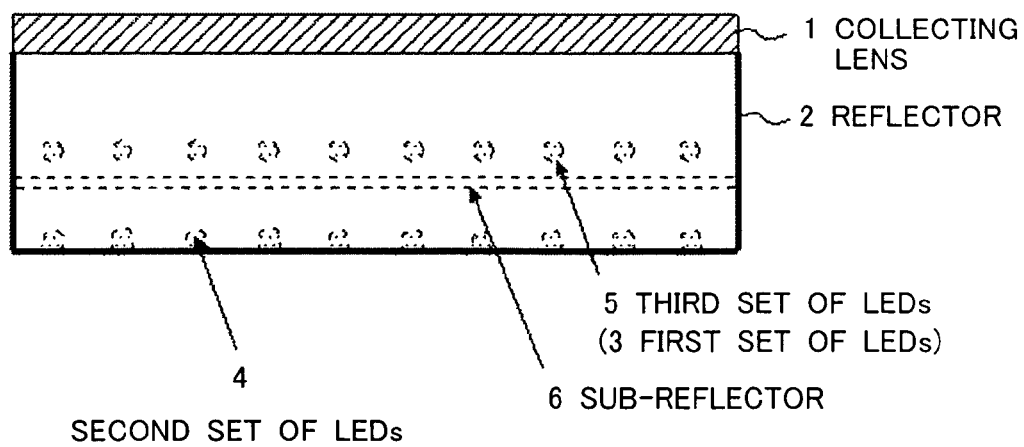
FIG. 6B is a schematic rear view of the illumination system according to the second embodiment of the invention, which is seen in the direction A in FIG. 6A.
Figure 7:
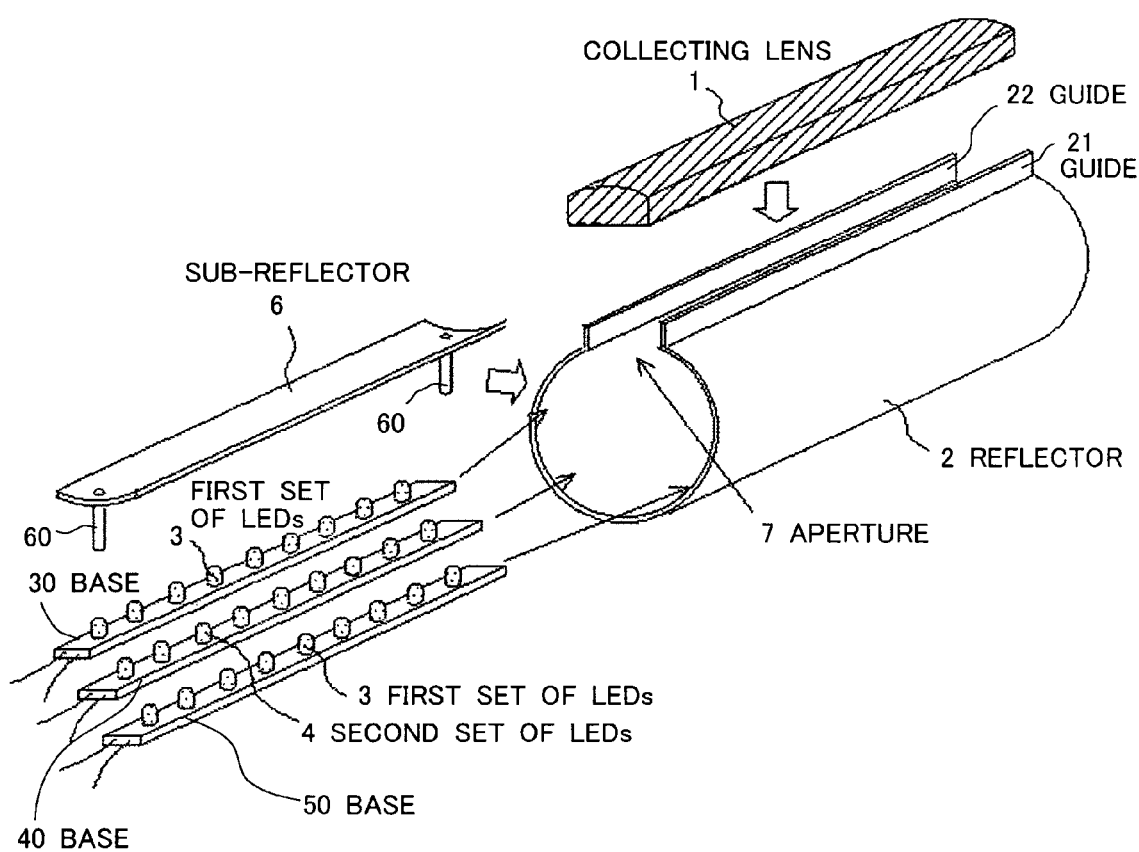
FIG. 7 is a schematic exploded perspective view showing an assembling manner of the illumination system according to the second embodiment of the invention, where a sub-reflector is additionally provided in the reflector.

Concretely speaking, as shown in FIGS. 6A and 6B, the illumination system according to the second embodiment is the same in configuration as the illumination system according to the first embodiment except that the sub-reflector 6 is additionally provided. Specifically, the system comprises the cylindrical reflector 2 having the aperture 7, the first set of LEDs 3, the second set of LEDs 4, the third set of LEDs 5, the bar-shaped collecting lens 1, and the sub-reflector 6. The collecting lens 1 is fixed to the reflector 2 to close the aperture 7.

The sub-reflector 6 has an arc-shaped cross section and extends along the longitudinal axis of the reflector 2. The sub-reflector 6 is fixed onto the inner surface of the reflector 2 in such a way that the light from the second set of LEDs 4 does not reach directly the collecting lens 1.

It is sufficient for the sub-reflector 6 to have an optical reflection function on its each surface. Thus, similar to the reflector 2, the sub-reflector 6 may be formed by processing a metal plate (e.g., an aluminum plate) or by forming a metal film on the inner surface of a molded tape-shaped plastic.

Figure 8A:
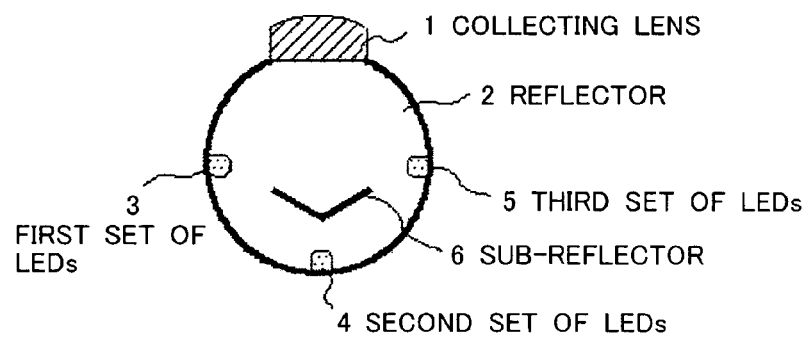
FIG. 8A is a schematic cross-sectional view of an illumination system according to a variation example of the second embodiment of the invention, where the sub-reflector has a V-shaped cross-section.
Figure 9:
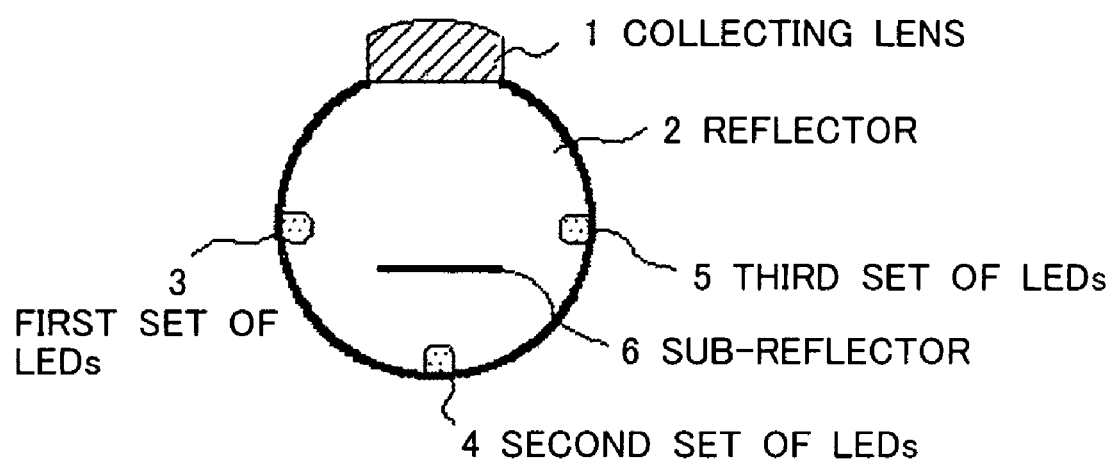
FIG. 9 is a schematic cross-sectional view of an illumination system according to a further variation example of the second embodiment of the invention, where the sub-reflector has a flat cross-section.

The fixing structure of the sub-reflector 6 onto the inner surface of the reflector 2 is not limited. For example, as shown in FIG. 7, a pair of columns 60 may be formed on the sub-reflector 6 at its ends and thereafter, the sub-reflector 6 may be fixed on the inner surface with the columns or short bars 60. Alternately, the sub-reflector 6 may be fixed to the circular right and left end plates (not shown in FIG. 7) of the reflector 2 at its both ends. Although both of the longer side edges of the sub-reflector 6 are not contacted with the inner wall of the reflector 2 in FIG. 6A, one of the longer side edges of the sub-reflector 6 may be contacted with the inner wall. Moreover, although the cross-section of the sub-reflector 6 in a plane perpendicular to the longitudinal axis of the reflector 2 is arc-shaped in the structure of FIGS. 6A and 7, the cross-sectional shape of the sub-reflector 6 may be determined optionally according to the necessity. For example, the cross-sectional shape of the sub-reflector 6 may be flat, in other words, the sub-reflector 6 may be formed by an elongated flat plate, as shown in FIG. 9. Alternately, the cross-section of the sub-reflector 6 may be V-shaped, as shown in FIG. 8A.

Figure 8B:
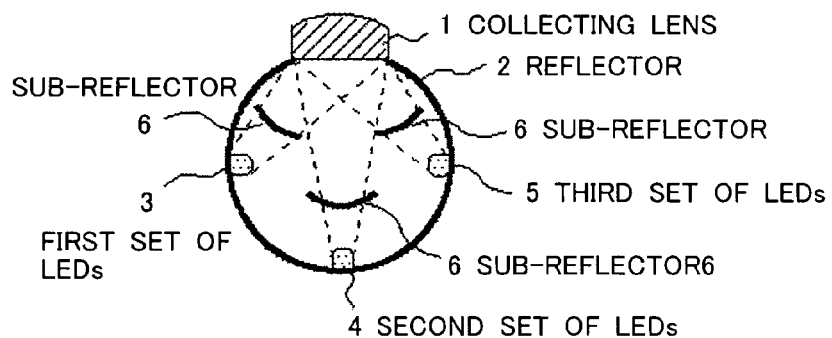
FIG. 8B is a schematic cross-sectional view of an illumination system according to another variation example of the second embodiment of the invention, where three sub-reflectors are provided for the first, second, and third LEDs.

In the above-described structure shown in FIGS. 6A and 6B, the sub-reflector 6 is located to confront with the collecting lens 1 in the reflector 2, thereby preventing the light from the second set of LEDs 4 from directly reaching the collecting lens 1. However, as shown in FIG. 8B, three sub-reflectors 6 may be provided in the reflector 2 in such a way as to confront with the first, second, and third sets of LEDs 3, 4, and 5, respectively, thereby preventing the light from the respective sets of LEDs 3, 4, and 5 from directly reaching the collecting lens 1.

Figure 8C:
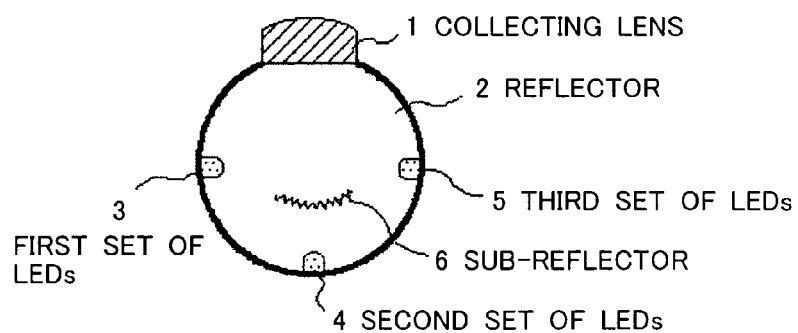
FIG. 8C is a schematic cross-sectional view of an illumination system according to still another variation example of the second embodiment of the invention, where the sub-reflector has an arc-shaped cross section and is waved to form surface irregularities on its both surfaces.

Moreover, the whole surface of the sub-reflector 6 may be formed like a mirror surface. However, to cause diffused reflection of the light from the LEDs 3, 4, or 5 more efficiently, the sub-reflector 6 itself or the inner and outer surfaces of the sub-reflector 6 may be waved or roughened to form minute surface irregularities or bumpiness, as shown in FIG. 8C. The surface irregularities or bumpiness may be formed on only the surfaces of the sub-reflector 6.

Next, the operation of the illumination system according to the second embodiment will be explained below.

For example, as shown in FIG. 6A, the light emitted from the second set of LEDs 4 is reflected by the inner surface of the reflector 2 and the outer surface of the sub-reflector 6 plural times (five times in FIG. 6A) to enter the collecting lens 1. Thereafter, the light penetrates through the lens 1 to enter the light guide plate 8 by way of its input end 9. Similarly, the light emitted from the first set of LEDs 3 and the third set of LEDs 5 is reflected by the inner surface of the reflector 2 and the inner or outer surface of the sub-reflector 6 plural times to enter the collecting lens 1. Thereafter, the light penetrates through the lens 1 to enter the light guide plate 8 by way of its input end 9. Here, it is supposed that the light color of the first set of LEDs 3 is red, the light color of the second set of LEDs 4 is green, and the light color of the third set of LEDs 5 is blue. Then, the red, green, and blue light from these LEDs 3, 4, and 5 are sufficiently mixed together in the cylindrical reflector 2 with the help of the sub-reflector 6, thereby generating white light with still less color irregularity.

Moreover, when a function of adjusting the luminance of the respective LEDs 3, 4, and 5 is provided, the white balance can be varied and therefore, desired white balance can be obtained.

As explained above, with the illumination system according to the second embodiment, the tube-shaped reflector 2 having the tube-shaped wall whose inner surface is reflective is provided. The wall includes the aperture 7 extending along the longitudinal axis of the reflector 2. In the reflector 2, the first, second, and third sets of LEDs 3, 4, and 5 that emit different color of light are arranged and at the same time, the sub-reflector 6 is provided in the reflector 2. The LEDs 3, 4, and 5 are arranged along the longitudinal axis of the reflector 2 to form linear light sources. The bar-shaped collecting lens 1 is fixed to the reflector 2 in such a way as to fill or block the aperture 7. Therefore, the light emitted from the respective LEDs 3, 4, and 5 can be repeatedly reflected on the inner surface of the reflector 2 and the inner and outer surfaces of the sub-reflector 6 more times than the first embodiment. As a result, the light can be more sufficiently mixed together to thereby generate white light. This means that white light with still less color irregularity is realizable with a simple structure while restraining the increase of size of the illumination system.

When the illumination system according to the second embodiment is used as the backlight unit of a LCD device, the display quality of the LCD device is improved furthermore compared with the first embodiment.

Other Embodiments

It is needless to say that the present invention is not limited to the above-described embodiments and their variation examples. Any other modification is applicable to these embodiments and variation examples.

For example, with the above-described first and second embodiments of the invention and their variation examples, red, green, and blue LEDs are used in combination. However, it is sufficient for the invention to include plural sets of LEDs whose light may be mixed together to generate white light. For example, if white light can be generated by two colors of light from two sets of LEDs, two sets of LEDs may be used for the invention. Similarly, if white light can be generated by four or more colors of light from four or more sets of LEDs, four or more sets of LEDs may be used for the invention.

In addition, the invention is applied to an illumination system where the light from the first, second, and third sets of LEDs is mixed to generate white light in the above-described embodiments and variation examples. However, the invention is applicable to an illumination system for illuminating any color of light other than white light.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An illumination system for display device, comprising:
a tube shaped reflector having a tube-shaped wall whose inner surface is reflective, the wall including an aperture extending along a longitudinal axis of the reflector;
plural sets of LEDs arranged on the tube-shaped wall in the reflector, colors of light to be emitted from the LEDs in each of the sets being different, the LEDs in each of the sets being arranged along the longitudinal axis of the reflector to form a linear light source; and
a collecting lens fixed to the reflector in such a way as to fill the aperture of the reflector,
wherein the LEDs in a first one of the sets are apart from the LEDs in a second one of the sets at a first distance in a circumferential direction of the reflector; and the LEDs in the second one of the sets are apart from the LEDs in a third one of the sets at a second distance alone the circumferential direction, where the second distance is equal to the first distance.

2. The system according to claim 1, wherein a cross section of the reflector along a plane perpendicular to the longitudinal axis is approximately circular, elliptical, or polygonal.

3. The system according to claim 1, wherein the inner surface of the reflector has surface irregularities.

4. The system according to claim 1, wherein all the LEDs are arranged at approximately equal intervals along the longitudinal axis.

5. The system according to claim 1, wherein intervals of the LEDs in at least one of the sets along the longitudinal axis are different from those of the LEDs in the remaining sets.

6. The system according to claim 1, further comprising sub-reflectors fixed to the reflector for the respective sets of LEDs, the sub-reflectors being extended along the longitudinal axis of the reflector; and
- each of the sub-reflectors is located in such a way as to shield the light emitted from the LEDs in the corresponding one of the sets toward the collecting lens.

7. The system according to claim 6, wherein at least one of the sub-reflectors has an approximately flat, V-shaped, or arc-shaped cross section along a plane perpendicular to the longitudinal axis.

8. The system according to claim 6, wherein at least one of the sub-reflectors has surface irregularities.

9. The system according to claim 6, wherein the sub-reflectors are apart from the inner surface of the reflector.

10. The system according to claim 1, wherein the LEDs in a first one of the sets emit red light, the LEDs in a second one of the sets emit green light, and the LEDs in a third one of the sets emit blue light.

11. A display device comprising:
- the illumination system according to claim 1;
- a light guide plate having an input end located to confront with the collecting lens of the illumination system; and
- a display panel located to confront with an output end of the light guide plate.

12. The device according to claim 11, wherein an LCD panel is included as the display panel, and the illumination system is included as a backlight unit for the LCD panel.

13. An illumination system for display device, comprising:
- a tube shaped reflector having a tube-shaped wall whose inner surface is reflective, the wall including an aperture extending along a longitudinal axis of the reflector;
- plural sets of LEDs arranged on the tube-shaped wall in the reflector, colors of light to be emitted from the LEDs in each of the sets being different, the LEDs in each of the sets being arranged along the longitudinal axis of the reflector to form a linear light source; and
- a collecting lens fixed to the reflector in such a way as to fill the aperture of the reflector,
- wherein the LEDs in a first one of the sets are apart from the LEDs in a second one of the sets at a first distance in a circumferential direction of the reflector; and the LEDs in the second one of the sets are apart from the LEDs in a third one of the sets at a second distance along the circumferential direction, where the second distance is different from the first distance.

14. An illumination system for display device, comprising:
- a tube shaped reflector having a tube-shaped wall whose inner surface is reflective, the wall including an aperture extending along a longitudinal axis of the reflector;
- plural sets of LEDs arranged on the tube-shaped wall in the reflector, colors of light to be emitted from the LEDs in each of the sets being different, the LEDs in each of the sets being arranged along the longitudinal axis of the reflector to form a linear light source; and
- a collecting lens fixed to the reflector in such a way as to fill the aperture of the reflector,
- wherein the LEDs in each of the sets are located on a base and the bases are fixed onto the inner surface of the reflector at intervals along a circumferential direction of the reflector.

15. The system according to claim 1, further comprising a sub-reflector fixed to the reflector, the sub-reflector being extended along the longitudinal axis of the reflector; and
- the sub-reflector is located in such a way as to shield the light emitted from the LEDs toward the collecting lens.

16. The system according to claim 15, wherein the sub-reflector has surface irregularities.

17. The system according to claim 15, wherein the sub-reflector is apart from the inner surface of the reflector.

18. The system according to claim 15, wherein the sub-reflector has an approximately flat, V-shaped, or arc-shaped cross section along a plane perpendicular to the longitudinal axis.

* * * * *